Figure 1:
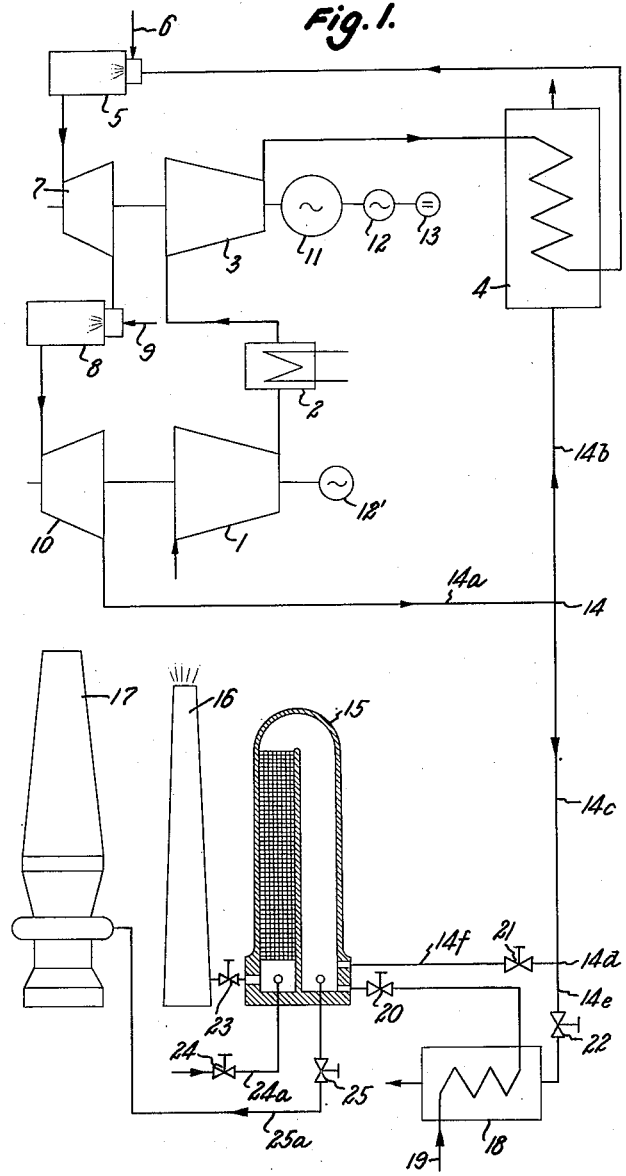

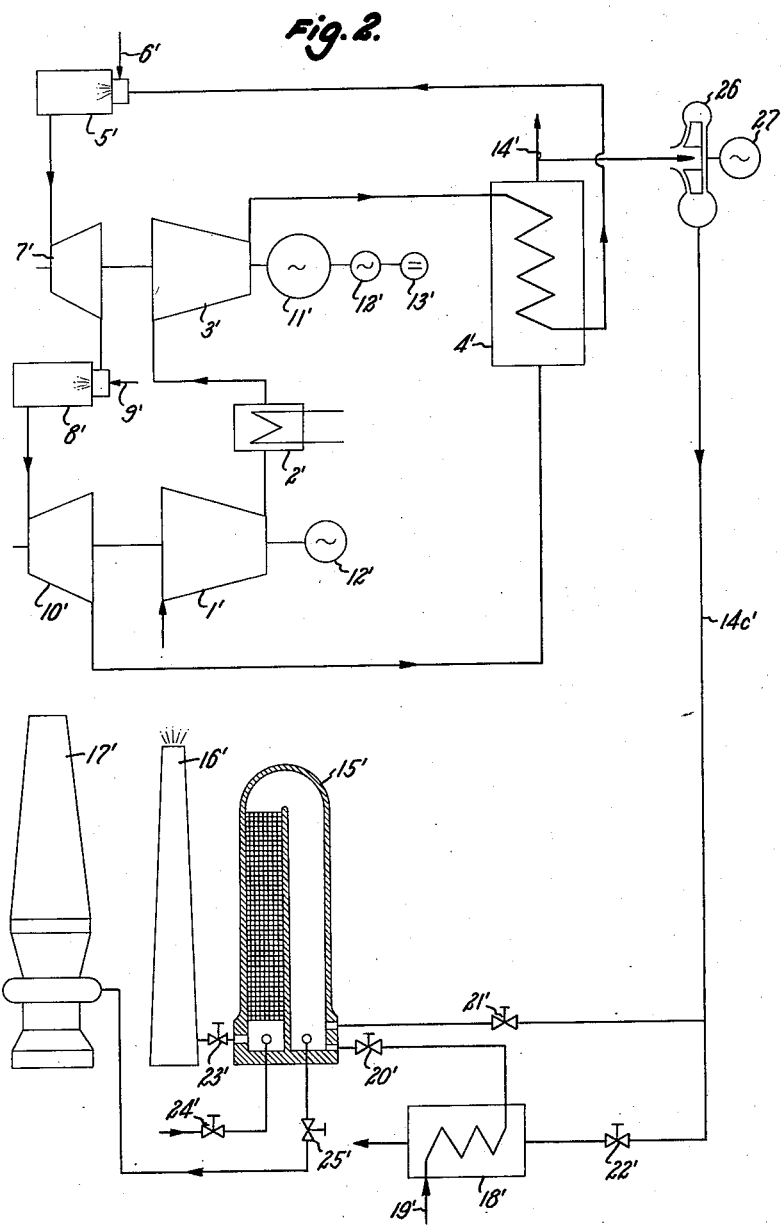

United States Patent Office 2,758,827
Patented Aug. 14, 1956

2,758,827

GAS TURBINE PLANT FOR USE IN METALLURGICAL WORKS

Hans Pfenninger, Baden, Switzerland, assignor to Aktiengesellschaft Brown, Boveri & Cie, Baden, Switzerland, a joint-stock company Application March 23, 1953, Serial No. 344,075

Claims priority, application Switzerland March 25, 1952

3 Claims. (Cl. 263—19)

This invention relates to metallurgical plants and in particular to one which includes blast furnace equipment and a combustion gas turbine plant operated in conjunction therewith and utilizing the discharge gases of the gas turbine plant as a source of heat for the blast heater component of the furnace equipment.

It has been proposed before to supply the waste discharge gases of the gas turbine of a gas turbine plant operating in an open process in a metallurgical plant to the blast heaters (regenerators, Cowper stoves) at least in part as combustion air. The idea was to let this utilization of the heat contained in the waste gases of the gas turbine take the place of its utilization in tube heat exchangers, for example, air preheaters or heating steam generators.

However, if in a metallurgical plant all blast furnace gas obtained from the blast furnaces is used for the generation of useful output in a gas turbine plant and for heating the blast heaters, then, as a rule, the total quantity of waste gases of the gas turbine is often greater than the partial quantity thereof which is needed as combustion air in the blast heaters hence a large portion of the waste gases must either be discharged into the atmosphere unutilized or conveyed to other usages. Moreover, the oxygen content of these waste gases in a gas turbine plant in which no air preheater is used is so low that it no longer suffices to reach the combustion temperature required to heat the blast in normal Cowper stoves without redesigning the latter. In a plant with air preheaters, in accordance with its higher efficiency, the oxygen content of the waste gases of the gas turbine is much higher, because for the same total quantity of air in the combustion chamber less fuel must be burned to heat the propellant to the desired operating temperature. For this reason it is desirable to provide an air preheater also in a gas turbine plant in a metallurgical plant in which the waste gases of the gas turbine are to be made use of for heating the blast heaters. The remaining oxygen deficiency in the turbine waste gases can further be compensated in that the blast-furnace gases which serve as fuel in the blast heaters, are preheated to a temperature much higher than the temperature at which they are usually obtained from blast furnaces. For this purpose an additional portion of the turbine waste gases may be used, since they are available in ample supply. When the advantages afforded by preheating the air and blast furnace gases are thus made use of, it will be possible in a metallurgical plant to heat the normally built blast heaters with blast furnace gas with the use of turbine waste gas as combustion air in such a way that the required combustion temperature is reached with a heat consumption reduced by about 15 to 30%, this constituting a great economic gain for a metallurgical plant.

Accordingly the invention relates to a gas turbine plant in association with a metallurgical plant and is characterized in that the waste gases of the gas turbine are utilized at least in part to preheat their own propelling air, to preheat the blast furnace gases to be burned in the blast heaters, and as combustion air in the blast heaters.

The invention will be more clearly understood from the following detailed description of two different embodiments together with the accompanying drawings in which:

Fig. 1 is a schematic view of a combustion gas turbine plant in association with a blast furnace installation according to the invention; and Fig. 2 is a view similar to Fig. 1 but showing a slight modification as to the path of the combustion gases leaving the turbine.

With reference now to Fig. 1, the combustion gas turbine plant is seen to be of the two stage type but it is to be understood that a single stage installation is within the inventive concept as defined in the appended claims. The low pressure stage compressor is indicated at 1 and it is driven by the low pressure stage turbine 10. Compressed air leaving compressor 1 passes through an interstage cooling device 2 and thence into the high pressure stage compressor 3 driven by the high pressure stage turbine 7. Compressed air leaving compressor 3 passes through an air preheater 4 heated by a portion of the exhaust gases from low pressure turbine 10 and is delivered to a high pressure combustion chamber 5 the fuel inlet to which is indicated at 6. The then very hot mixture of air and combustion gases passes from chamber 5 through high pressure turbine 7 to drive the latter and its compressor 3 and a useful work machine such as the electric generator 11. On the same shaft with generator 11 is the usual motor 12 for starting the turbine and the exciter 13 for supplying field current to generator 11. The gases pass from turbine 7 to an interstage combustion chamber 8 having a fuel inlet 9 for a second heating and are then passed into low pressure stage turbine 10 which drives low pressure compressor 1 and its starting motor 12.

After leaving turbine 10, the combustion gases which still possess considerable heat pass through a conduit 14a to a junction 14 which divides them into two portions. One portion passes through conduit 14b to air preheater 4 of the gas turbine plant which extracts substantially all of the useful heat therefrom. The other portion of the exhaust gases passes through conduit 14c for use in the blast furnace plant which comprises a regenerative blast heater 15 such as for example a Cowper stove operating basically on a natural draft produced by chimney 16, a preheater 18 for gases used in heating up the blast heater 15, and blast furnace 17. Hot gases for storing heat in the blast heater 15 during the heating-up period enter preheater 18 through inlet 19. These gases can be obtained in part from the gas discharge of the blast furnace. After leaving preheater 18 the gases pass through cut-off valve 20, which is open only during the heating-up period, into blast heater 15 and heat up the heat storage mass therein. The gases are then discharged from the heater through cut-off valve 23 into chimney 16. Valve 23 is likewise open only during the heating-up period of blast heater 15.

For heating the gases going through preheater 18 into the blast heater 15, it will be seen that a portion of the exhaust gases coming from the combustion gas turbine plant through conduit 14c is used, there being a junction 14d in the latter conduit by which a portion of the gases is led off through conduit 14e and cut-off valve 22 for flow through preheater 18. Another portion of the gases is led off through conduit 14f and cut-off valve 21 into blast heater 15 to supply a part of the combustion air necessary therein.

During the blow-off period of heater 15 at which time the heat stored therein is used to heat up the air for the blast furnace, valves 23 and 20 are closed, air enters heater 15 through cut-off valve 24 and conduit 24a, is heated, leaves the heater 15 through valve 25 and is delivered to the bustle on blast furnace 17. Valves 24, 25 are of course closing during the heating up period of heater 15 and valves 20, 21 and 23 are closed during the blow-off period. The gas pressure prevailing at junction 14 suffices completely to overcome all resistance to the chimney exit from the heater 15.

Fig. 2 shows only a slightly modified arrangement and hence the same reference numerals but with primes added have been used to indicate like components in the two arrangements. Whereas in the Fig. 1 embodiment, only a portion of the combustion gases leaving low pressure turbine 10 pass through preheater 4 of the combustion gas turbine plant, it will be noted that in the embodiment of Fig. 2, all of such combustion gases are first passed through preheater 4', i. e. the junction 14' for leading off a portion of these gases to the blast furnace plant is located on the discharge side of the preheater. To compensate for the pressure drop which the waste gases suffer in preheater 4', a fan 26 with driving motor 27 is inserted in conduit 14c' leading to the blast furnace plant.

The principal advantage of the present invention over prior known arrangements is that it enables one to combine a complete and essentially independently operable gas turbine plant of conventional design operating on the "open" process as illustrated in Figs. 1 and 2, i. e. a plant wherein the compressor component takes in air at atmospheric pressure and discharges the waste combustion gases from the turbine component, which drives a useful work device such as an electric generator, at essentially the same pressure, with a blast furnace plant also of conventional design and also essentially complete within itself, i. e. one wherein the principle of natural draft is utilized to effect flow of heating gas through the blast heater, the two plants being combined in such manner that the waste combustion gases from the turbine component are utilized simultaneously for (1) preheating the air utilized in the turbine plant, (2) preheating the flue gases entering the blast heater of the blast furnace plant, and (3) as combustion air delivered directly into the blast heater for combination with the flue gas. Such a three-fold simultaneous utilization of the waste combustion gases results in considerable improvement in the overall economy of the entire combined plant as previously explained. Moreover, since neither the turbine plant nor the blast furnace plant is required to be modified from its conventional design and each is basically complete and operative within itself, each can be arranged to operate at any time independently of the other in a most simple manner. As is clear from the drawings, the gas turbine plant can be divorced from the blast furnace plant merely by closing valves 21 and 22 in Fig. 1 whereupon all the waste gases from turbine 10 will be put through the air preheater 4 for the compressed air in the turbine plant. In the Fig. 2 embodiment, the same result can be obtained by shutting down the fan 26 whereby to stop the suction of the turbine discharge gases at junction 14' on the discharge side of preheater 4'.

In conclusion, it will be understood that while the illustrated embodiments of my invention are preferred, various changes in the arrangement and choice of components may be made without however departing from the spirit and scope of the invention as defined in the appended claims.

I claim:

1. An industrial installation comprising complete and essentially independently operable interrelated combustion gas turbine and blast furnace plants, said combustion gas turbine plant including coupled compressor and turbine units, a first preheater for air disposed at the outlet side of said compressor unit, a combustion chamber disposed at the inlet side of said turbine unit and which receives compressed air from said preheater, and a useful work device such as an electric generator driven by said turbine unit, said blast furnace plant including a blast furnace, a regenerative blast heater connected to said blast furnace, a chimney connected to said blast heater for inducing flow of heating gases therethrough, a supply conduit to said blast heater for delivering fuel gases thereto for combustion therein and a second preheater through which pass said supply conduits for preheating said fuel gases, and conduit means extending from the outlet side of said turbine unit delivering the exhaust gases from said turbine unit to said first preheater for preheating the air utilized in said turbine plant and to said second preheater for preheating the fuel gases prior to delivery to said blast heater and into said blast heater to serve as part of the combustion air for said fuel gases.

2. An industrial installation as defined in claim 1 wherein all of the exhaust gases from said turbine unit pass through said first preheater prior to distribution to said second preheater and blast heater.

3. An industrial installation as defined in claim 1 wherein only a portion of said turbine exhaust gases are passed through said first preheater, the remainder of said gases being delivered to said blast furnace plant and being distributed to said second preheater and blast heater.

References Cited in the file of this patent

UNITED STATES PATENTS

| | | |
|---|---|---|
| 2,163,762 | Noack et al. | June 27, 1939 |
| 2,632,297 | Ogston | Mar. 24, 1953 |